United States Patent
Rao et al.

(10) Patent No.: US 7,861,211 B2
(45) Date of Patent: Dec. 28, 2010

(54) MOBILE HANDSET WITH UPDATE AGENT IMPLEMENTED IN HARDWARE

(75) Inventors: Bindu Rama Rao, Laguna Nigel, CA (US); Xuguang Yang, Sunnyvale, CA (US); Harri Okonnen, Dana Point, CA (US); Sidney A. Jacobi, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 10/902,452

(22) Filed: Jul. 29, 2004

(65) Prior Publication Data

US 2005/0055684 A1   Mar. 10, 2005

Related U.S. Application Data

(60) Provisional application No. 60/491,459, filed on Jul. 29, 2003.

(51) Int. Cl.
*G06F 9/44* (2006.01)

(52) U.S. Cl. ........................ 717/100; 717/171

(58) Field of Classification Search ......... 717/168–176, 717/100
See application file for complete search history.

(56) References Cited

U.S. PATENT DOCUMENTS

| | | | | |
|---|---|---|---|---|
| 5,261,055 A | 11/1993 | Moran et al. | ............... | 395/275 |
| 5,442,771 A | 8/1995 | Filepp et al. | ............... | 395/650 |
| 5,479,637 A | 12/1995 | Lisimaque et al. | ......... | 395/430 |
| 5,579,522 A | 11/1996 | Christeson et al. | ......... | 395/652 |
| 5,596,738 A | 1/1997 | Pope | ......................... | 395/430 |
| 5,598,534 A | 1/1997 | Haas | ..................... | 395/200.09 |
| 5,608,910 A | 3/1997 | Shimakura | ................. | 395/670 |
| 5,623,604 A | 4/1997 | Russell et al. | ............ | 395/200.1 |
| 5,666,293 A | 9/1997 | Metz et al. | ............... | 395/200.5 |
| 5,752,039 A | 5/1998 | Tanimura | .................... | 395/712 |
| 5,778,440 A | 7/1998 | Yiu et al. | ..................... | 711/154 |
| 5,790,974 A | 8/1998 | Tognazzini | ................. | 701/204 |
| 5,802,338 A * | 9/1998 | Rechtschaffen et al. | ..... | 712/217 |
| 5,822,578 A * | 10/1998 | Frank et al. | ................. | 712/244 |
| 5,878,256 A | 3/1999 | Bealkowski et al. | ........ | 395/652 |
| 5,960,445 A | 9/1999 | Tamori et al. | ............... | 707/203 |
| 6,009,497 A | 12/1999 | Wells et al. | .................. | 711/103 |
| 6,038,636 A | 3/2000 | Brown, III et al. | .......... | 711/103 |
| 6,064,814 A | 5/2000 | Capriles et al. | ............. | 395/701 |
| 6,073,206 A | 6/2000 | Piwonka et al. | ............. | 711/102 |

(Continued)

FOREIGN PATENT DOCUMENTS

CA     2339923     3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Philip Wang

(57) ABSTRACT

Aspects of the present invention may be seen in a system and method for speeding up the processing of update packages by an update agent, by implementing at least a portion of the update agent in hardware. In an embodiment of the present invention, the update agent in hardware may process executable instructions in parallel.

12 Claims, 5 Drawing Sheets

U.S. PATENT DOCUMENTS

| | | | | |
|---|---|---|---|---|
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,167,567 | A | 12/2000 | Chiles et al. | |
| 6,198,946 | B1 | 3/2001 | Shin et al. | 455/561 |
| 6,247,168 | B1 | 6/2001 | Green | |
| 6,279,153 | B1 | 8/2001 | Bi et al. | 717/11 |
| 6,311,322 | B1 | 10/2001 | Ikeda et al. | 717/1 |
| 6,421,325 | B1 | 7/2002 | Kikinis | |
| 6,438,585 | B2 | 8/2002 | Mousseau et al. | 709/206 |
| 6,467,087 | B1 * | 10/2002 | Yang | 717/168 |
| 6,990,659 | B1 * | 1/2006 | Imai | 717/171 |
| 7,093,244 | B2 * | 8/2006 | Lajoie et al. | 717/168 |
| 7,146,609 | B2 * | 12/2006 | Thurston et al. | 717/169 |
| 7,165,109 | B2 * | 1/2007 | Chiloyan et al. | 709/227 |
| 7,178,141 | B2 * | 2/2007 | Piazza | 717/168 |
| 7,203,723 | B2 * | 4/2007 | Ogawa | 709/203 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2003/0068162 | A1 * | 4/2003 | Tsai et al. | 386/125 |
| 2003/0088868 | A1 * | 5/2003 | Chang et al. | 717/173 |
| 2003/0194033 | A1 * | 10/2003 | Tiedemann et al. | 375/354 |
| 2004/0005906 | A1 * | 1/2004 | Okumura et al. | 455/522 |
| 2004/0031029 | A1 * | 2/2004 | Lee et al. | 717/171 |
| 2004/0088473 | A1 * | 5/2004 | Ogle | 711/100 |
| 2004/0215755 | A1 * | 10/2004 | O'Neill | 709/223 |
| 2005/0060711 | A1 * | 3/2005 | Ericsson et al. | 718/107 |
| 2005/0102660 | A1 * | 5/2005 | Chen et al. | 717/168 |

FOREIGN PATENT DOCUMENTS

| | | |
|---|---|---|
| EP | 1184785 | 3/2002 |
| JP | 8202626 | 8/1996 |
| KR | 2002-0034228 | 5/2000 |
| KR | 2001-0100328 | 11/2001 |
| WO | 0241147 | 5/2002 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MOBILE HANDSET WITH UPDATE AGENT IMPLEMENTED IN HARDWARE

RELATED APPLICATIONS

This patent application makes reference to, claims priority to and claims benefit from U.S. Provisional Patent Application Ser. No. 60/491,459, entitled "Mobile Handset with an Update Agent Implemented in Hardware," filed on Jul. 29, 2003.

The complete subject matter of the above-referenced U.S. Provisional Patent Application is hereby incorporated herein by reference, in its entirety. In addition, this application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Problems often arise while conducting updates of firmware/software in such electronic devices, problems such as, for example, lack of sufficient processing power for some applications or software components, lack of sufficient memory to execute code, a need to trade off memory space for time, etc.

Electronic devices may use update packages containing information necessary to update firmware/software in electronic devices. Update packages may be downloaded into handsets such that their software and/or firmware could be updated. Executing instructions in update packages can take a significant amount of time, which may be bothersome to users of electronic devices.

Certain activities in electronic devices such as, for example, parsing XML documents, encrypting data etc. take significant processing power and resources to execute. Other activities such as, for example, updating components (firmware/software) involve repetitive tasks that often require the execution of significant amounts of code.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that facilitates the updating of firmware in an electronic device, using updating information received through a network. The system may comprise at least one electronic device comprising firmware, hardware, and an updating function that converts the firmware from one version to another, using updating information, wherein at least a portion of the updating function is implemented in the hardware. The system may also comprise a generator that generates the updating information and makes it available for dissemination to the at least one electronic device, wherein the generated updating information comprises instructions and data that is executable by the at least a portion of the updating function that is implemented in hardware. In an embodiment of the present invention, the network may be wireless. In an embodiment of the present invention, the at least one electronic device may be portable.

In an embodiment of the present invention, the at least one electronic device may download updating information based on device information such as manufacturer identification, model identification, firmware version, or whether the updating function is implemented in software, hardware, or a combination thereof.

In an embodiment of the present invention, the generator may be capable of determining executable instructions that can be processed in parallel. In an embodiment of the present invention, the updating information generated by the generator may comprise multiple instruction streams for parallel processing and the hardware may be capable of processing executable instructions in parallel.

Another aspect of the present invention may be seen in an electronic device that employs an updating function to convert firmware in the electronic device from one version to another, using updating information received via a communication link, wherein at least a portion of the updating function is implemented in hardware. The electronic device may communicate device information to a generator that generates the updating information based on the device information.

Yet another aspect of the present invention may be seen in a generator that generates updating information to convert firmware from one version to another, wherein the updating information comprises executable instructions at least a portion of which is executed in hardware. In an embodiment of the present invention, the generator may be communicatively coupled to at least one electronic device, wherein the generated updating information may be communicated to the at least one electronic device.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to updating firmware/software in an electronic device such as, for example, a mobile handset in a carrier network. More specifically, the present invention relates to implementing an update agent in hardware to make the update process faster. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
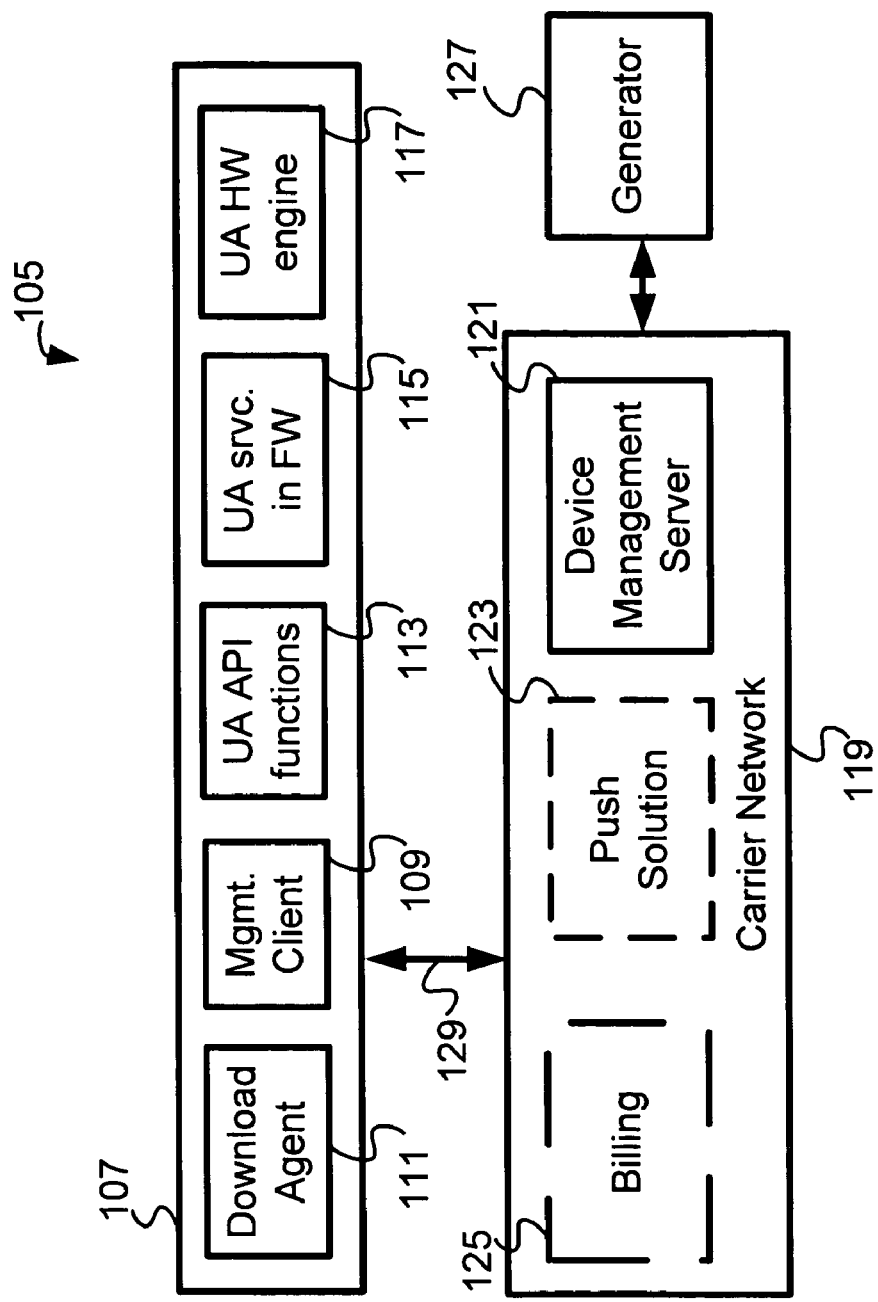
FIG. 1 illustrates a block diagram of an exemplary update system for downloading firmware/software updates in a mobile handset, in accordance with an embodiment of the present invention.

FIG. 1 illustrates a block diagram of an exemplary update system 105 for downloading firmware/software updates in a mobile handset 107, in accordance with an embodiment of the present invention. An update package for an electronic device such as, for example, mobile handset 107 may comprise executable instructions used to convert firmware/software in the mobile handset 107 from one version to another. Such executable instructions may be referred herein as "update instructions".

In an embodiment of the present invention, the update system 105 may comprise the mobile handset 107, a generator 127, and a carrier network 119. The generator 127 may generate update packages, which may be employed by the update system 105 to facilitate the update of the mobile handset 107. The carrier network 119 may facilitate the delivery of the appropriate generated update packages to the mobile handset 107 based on device characteristics provided by the mobile handset 107. The device characteristics may be such as, for example, a manufacturer identification, model identification, firmware version of the mobile handset 107, etc. Based on such device characteristics the carrier network 119 may retrieve an appropriate update package from the generator 127, and communicate it to the mobile handset 107 via communication link 129. In an embodiment of the present invention, the communication link 129 may be a wired or wireless network such as, for example, a cellular network.

In an embodiment of the present invention, the generator 127 may communicate a generated update package to a delivery server (not shown) for dissemination to the mobile handset 107. Based on device characteristics provided by the mobile handset 107, the delivery server may deliver the update package to the appropriate devices. In an embodiment of the present invention, the delivery server may be located in the carrier network 119.

In an embodiment of the present invention, the carrier network 119 may comprise a device management (DM) server 121, a push solution 123, and billing capabilities 125. In an embodiment of the present invention, the DM server 121 may distribute update packages to electronic devices such as, for example, a mobile handset 107.

In an embodiment of the present invention, the mobile handset 107 may be capable of updating its firmware/software based on the availability of an update agent in its hardware. In such an embodiment, the carrier network 119 may retrieve an update package that may be employed by the update agent available in the hardware of the mobile handset 107.

In an embodiment of the present invention, the mobile handset 107 may comprise a management client 109, a download agent 111, update agent API functions 113, an update agent service in firmware 115, and an update agent hardware engine 117. The management client 109 may assist in managing the resources and the execution of management tasks of the mobile handset 107. The download agent 111 may download update packages generated by the generator 127 and delivered through the carrier network 119. The update agent hardware engine 117 may implement at least a portion of the functionality of updating firmware/software in the hardware of the mobile handset 107 such as, for example, in specialized chipsets. The update agent service in firmware 115 may employ features provided by the update agent hardware engine 117. The update agent API functions 113 may provide various update activity-related functions, which may be at the operating system (OS) layer or the applications layer (not shown) of the mobile handset 107.

In an embodiment of the present invention, the mobile handset 107 may comprise a hardware implementation of the update agent, in which case the generator 127 may generate an optimized update package. For example, an update package that may be processed with "parallel processing" in the hardware update agent may require the generator to create multiple instruction streams that may be processed in parallel. The generator 127 may specify a sequence of instructions based on possible dependency between adjacent instructions and the opportunities for parallelism that may be available.

In an embodiment of the present invention, the generator 127 may employ multiple instruction streams in generating an update package. Such multiple instruction streams may be the basis of parallel processing of update instructions/activities in the mobile handset 107. The updating of firmware/software may be executed by an update agent in firmware, hardware, or in a combination thereof.

In an embodiment of the present invention, the multiple instruction streams may comprise at least one op-code stream, at least one data stream such as, for example, SET data, and at least one variable length integer (VLI) stream that may be used for addresses, offsets, etc.

In an embodiment of the present invention, the mobile handset 107 may employ the update agent hardware engine 117 regardless of the location of the target components such as, for example, firmware application layers or operating system (not shown). In an embodiment of the present invention, the update agent service in firmware 115 may operate as a device driver and provide access to the update agent hardware engine 117. The update agent API functions 113 such as, for example, functions in the operating system layers of the mobile handset 107 may be used by components such as, for example, the management client 109 to update components such as those in an application layer, configuration parameters, network parameters, subscriber information, etc.

In an embodiment of the present invention, the generator 127 may generate the same update package regardless of whether the mobile handset 107 processes the update package in hardware employing the update agent hardware engine 117. The mobile handset 107 may employ the update agent hardware engine 117, if one exists in the mobile handset 107, to execute at least a portion of the instructions in the update package downloaded by the mobile handset 107.

In an embodiment of the present invention, the mobile handset 107 may employ the update agent hardware engine 117 to execute a portion of the instructions from the update package downloaded by the mobile handset 107. In such an embodiment, the mobile handset 107 may employ the update agent service in firmware 115 to execute other instructions provided in the update package.

When implemented in hardware, the update agent may speed up the processing of update packages by an update agent in the mobile handset 107. In an embodiment of the present invention, the update instructions may be implemented in the update agent hardware engine 117. The logic of the update agent may, for example, be implemented as a MACRO cell that may be referred to as, for example, a UAMacrocell. Several instances of such a UAMacrocell may exist in hardware such as, for example, a chipset. As a result, parallel processing of the execution of update instructions may be supported. Additionally, a MACRO cell may also be employed for security functionality such as, for example, Public Key Infrastructure (PKI), encryption, message digest, etc. A MACRO cell may also be incorporated into the update agent hardware engine 117 for cyclic redundancy check (CRC) computations. Such a MACRO cell may be referred to as, for example, a CRCMacrocell.

Figure 2A:
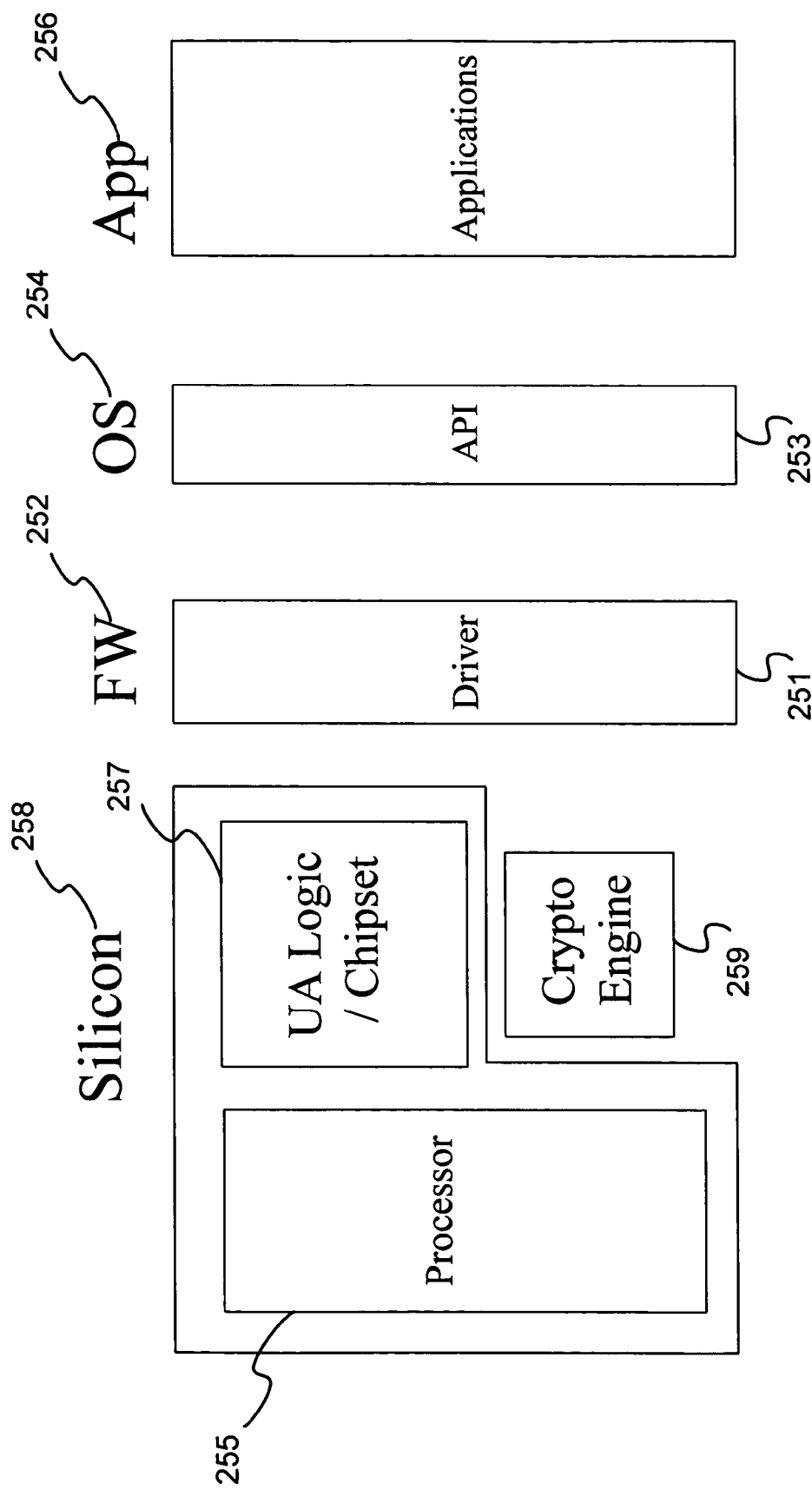
FIG. 2a illustrates a block diagram of an exemplary layout of an update system in a mobile handset, in accordance with an embodiment of the present invention.

FIG. 2a illustrates a block diagram of an exemplary layout of an update system in a mobile handset, in accordance with an embodiment of the present invention. A driver 251 may be at the firmware layer 252 in the mobile handset such as, for example, mobile handset 107 of FIG. 1. The driver 251 may interface with the update agent hardware of the mobile handset to drive the updating process in the mobile handset. Update agent API functions 253 may provide various update activity-related functions, which may be at the operating system (OS) layer 254 or the applications layer 256 of the mobile handset. In an embodiment of the present invention, at least a portion of the update agent may be implemented in hardware (silicon) 258. The hardware 258 may comprise a processor 255 such as, for example, an ARM processor by ARM Ltd., and an update agent logic/chipset 257.

In an embodiment of the present invention, the hardware 258 may be integrated with an existing hardware in the system such as, for example, a Public Key Infrastructure (PKI) chipset that may be already in silicon. Encryption/decryption may be invoked within the update agent utilizing a crypto engine 259.

Figure 2B:
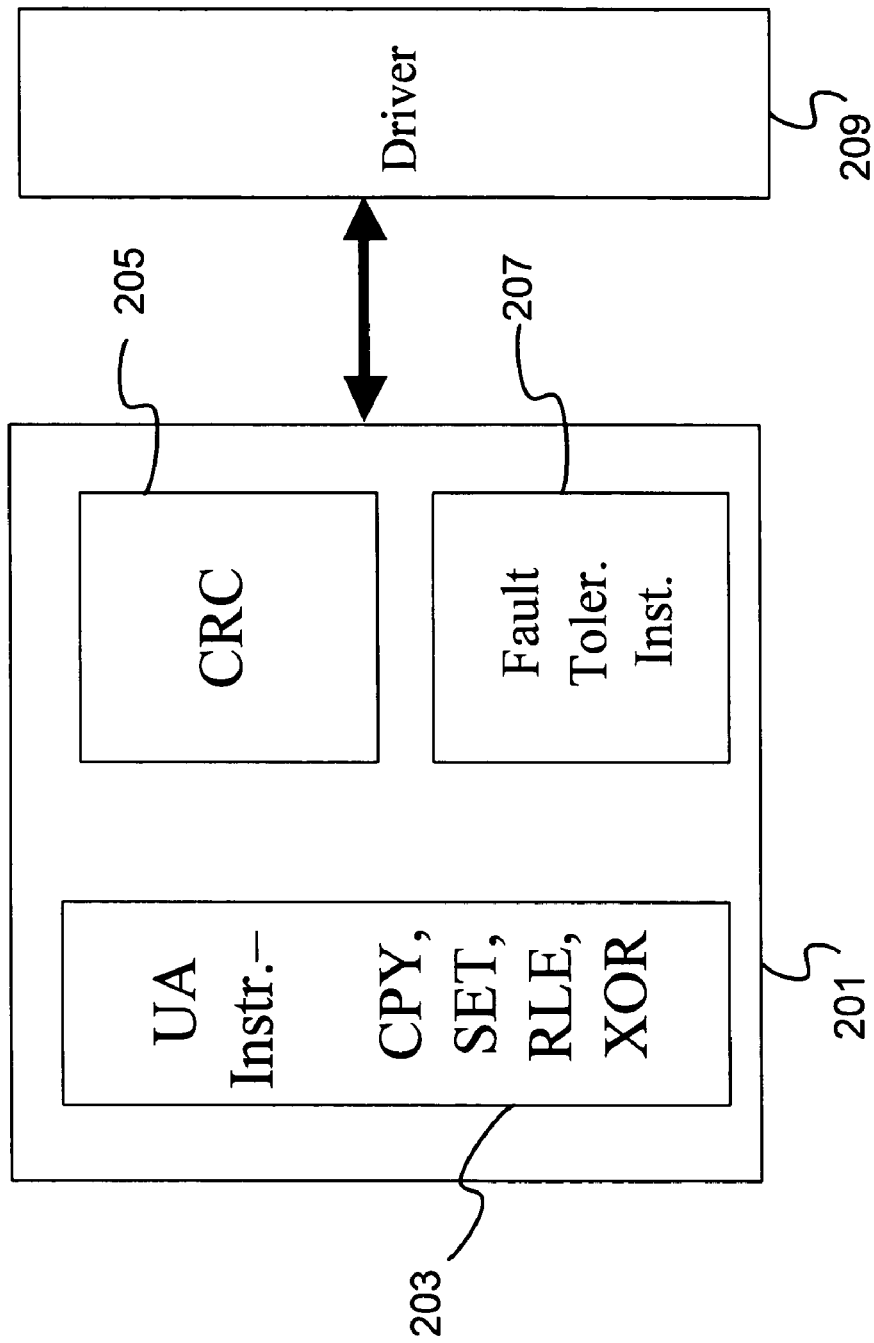
FIG. 2b illustrates an exemplary update agent logic, or UAMacrocell, in accordance with an embodiment of the present invention.

FIG. 2b illustrates an exemplary update agent logic, or UAMacrocell 201, in accordance with an embodiment of the present invention. In an embodiment of the present invention, an update agent instructions functional block 203 in the UAMacrocell 201 may implement update instructions such as, for example, SET, COPY, RLE, and XOR. Where COPY may be an instruction to copy a portion of memory in the mobile handset from one memory location to another, SET may be an instruction to change a portion of memory in the mobile handset to a set of predefined values, RLE may be an instruction that may process run length encoded portions of the update package, and XOR may be an instruction that may modify memory in the mobile handset using an exclusive-or function and the update package. The UAMacrocell 201 may also comprise a CRC functional block 205 and fault tolerant instructions functional block 207. The CRC functional block 205 may, for example, be capable of performing cyclic redundancy check computations on blocks or banks of memory of an electronic device such as, for example, mobile handset 107. The fault tolerant instructions functional block 207 may implement functionality related to the prevention of the loss of information in the event of an interruption of an update activity. An API may be utilized to provide an update service that would invoke update commands through the update chip driver 209.

In an embodiment of the present invention, the two most basic instructions in the update agent may be the COPY and SET instructions. The SET instruction may be implemented in a fashion similar to a COPY instruction, where the COPY instruction may copy data from the update package, whereas the SET may copy from the memory of the mobile handset. For example, the COPY (or SET) instructions may be implemented with the following function prototype:

boolean doCopy(int32 s_addr, int32 d_addr, int_32 length), where s_addr may be the address of source data, d_addr may be the address of destination data, and length may be the length of the data to be copied (or set). In hardware, three register may be utilized for implementing the COPY or SET instruction, and one flag bit may be used for output to indicate, for example, whether the COPY/SET succeeded or failed.

In an embodiment in accordance with the present invention, the checking of the CRC of a block or bank of memory may also be implemented in hardware, and may, for example, be accessed using an interface function represented by the following function prototype:

int32 calcCRC(int32 addr, int32 length), in which case two registers may be used for the input parameters, and one register may be used for the return or output value, which may be the CRC value. The parameter addr may represent the initial location of a block or bank for which a CRC is to be calculated, and the parameter length may represent the length of the region of memory over which the CRC is to be calculated.

In an embodiment of the present invention, failure recovery may also be implemented in hardware using a function represented by the following function prototype:

int32 do_failure_recovery(int32 old_crc, int32 new_crc), where two registers may be used for the input parameters for the starting addresses for the old (old_crc) and new (new_crc) CRCs in an update package, and one register may be used for the output or return value indicating the recovery address.

Figure 3:
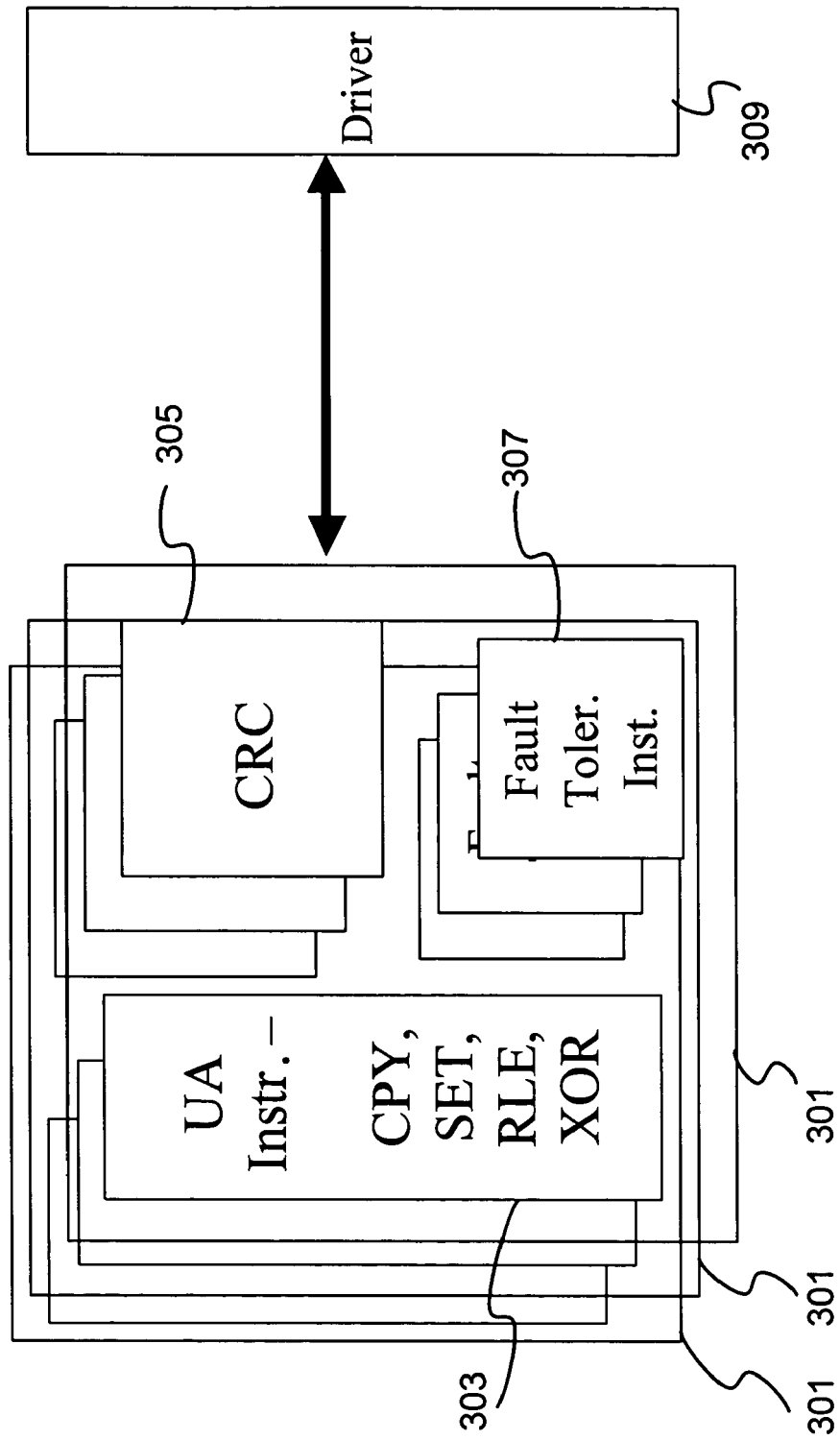
FIG. 3 illustrates a block diagram of exemplary UAMacrocells, which may be used for parallel processing, in accordance with an embodiment of the present invention.

FIG. 3 illustrates a block diagram of a plurality of exemplary UAMacrocells 301, which may be used for parallel processing, in accordance with an embodiment of the present invention. In an embodiment of the present invention, several instances of update agent logic modules, or UAMacrocells 301 may be used. Each UAMacrocell 301 may comprise update agent instructions functional block 303, a CRC functional block 305, and a fault tolerant instructions functional block 307. An API may be utilized to provide an update service that may invoke update commands through the update chip driver 309. In an embodiment of the present invention, op-code look-ahead may be performed to determine which of the op-codes may be executed in parallel. A generator such as, for example, the generator 127 of FIG. 1 may determine which instructions/op-codes may depend upon completion of previous instructions/op-codes, which may be executed in parallel, etc. Information regarding parallel execution may be sent to an electronic device such as, for example, mobile handset 107 in the update package.

In an embodiment of the present invention, the generator 127 may determine which instructions in an update package may be executed in parallel and which instructions are dependent upon completion of previous instructions. The generator may send information regarding parallel execution to the mobile handset 107 in the update package.

Figure 4:
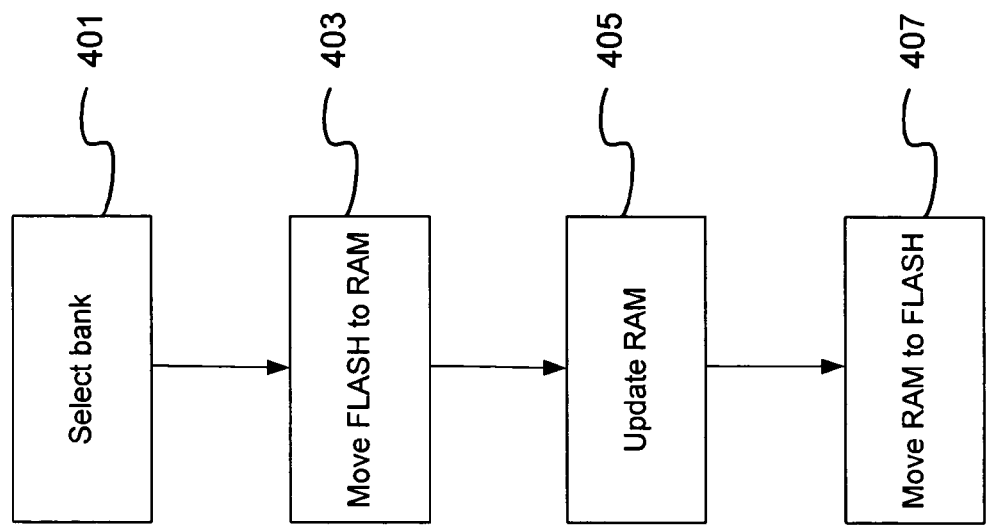
FIG. 4 illustrates a flow diagram of an exemplary update process in a mobile handset, in accordance with an embodiment of the present invention.

FIG. 4 illustrates a flow diagram of an exemplary update process in a mobile handset, in accordance with an embodiment of the present invention. In an embodiment of the present invention, the update of the firmware/software of an electronic device may modify a portion of the banks/blocks of memory of the electronic device. The information in an update package may be organized according to the bank/block of memory to which it is to be applied. The sequence of actions shown in the method illustrated in FIG. 4, and described below, may be repeated for each of the banks/blocks to be updated using the update package. In the method of FIG. 4, a next bank to be updated may be selected from the banks to which the update package is to be applied, at a step 401. The contents of the bank/block to be updated may then be moved from non-volatile memory (e.g., FLASH memory) to a portion of the RAM of the electronic device at a step 403. Next, update instructions from the portion of the update package associated with the update of the selected bank/block may be applied to the contents of the RAM. In an embodiment of the present invention, the update instructions may, for example, comprise the SET and COPY instructions described above, and the update instructions may be decoded in preparation for execution. The update instruction may be then executed and the RAM updated accordingly at a next step 405. The updated contents of the RAM may then be moved back to the flash memory at a step 407. In an embodiment of the present invention, one or more CRCs may be checked to determine whether a bank/block of memory may have already been updated, permitting the selection of each bank/block to be processed.

In an embodiment of the present invention, an update agent may be implemented in software, and an update driver such as, for example, the update driver 309 of FIG. 3 may drive the update agent software to execute steps 401, 403, 405, and 407.

In another embodiment of the present invention, at least a portion of the update agent may be implemented in hardware such as, for example, the hardware update agent components described with respect to FIGS. 2a, 2b, and 3, above. In such an embodiment, a driver such as the update driver 309 may, for example, drive the update agent software portion to execute steps 401, 403, and 407 of FIG. 4, and drive the update agent hardware components to perform at least a portion of the updating of the RAM as in step 405.

In yet another embodiment of the present invention, the update agent may, for example, be implemented entirely in hardware, and a driver such as the update driver 309 may, for example, provide the update agent hardware with information regarding the bank(s)/block(s) to be updated. The update agent hardware components may then, for example, automatically perform steps 401, 403, 405, and 407.

In an embodiment of the present invention, at portion of the update instructions in an update package may be executed in parallel, and at least a portion of the update agent may be implemented in hardware components. In such an embodiment, a driver such as, for example, the update driver 309 may drive the update agent software or hardware components to perform, for example, steps 401 and 403, and a number of update agent hardware components may perform step 405 in parallel, to execute the parallel update instructions of the update package.

In an embodiment of the present invention, one or more of the update instructions may be decoded and stored until the update agent is ready to execute the update instructions. The update driver may then feed the decoded update instructions to the update agent for execution. In a related embodiment, the update agent may be implemented in hardware components, and a number of update agent hardware components may be utilized, where parallel decoded update instructions may be fed to the update agents for parallel execution.

In an embodiment of the present invention, the update instructions in the update package information for each bank/block to be updated may be ordered in an optimal order prior to execution. The optimal order may rely on the dependence of update instructions on the execution of other update instructions, and the update of one or more banks/blocks of memory of the electronic device, and may group parallel update instructions together.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile handset, comprising:
   a chipset that includes a plurality of instances of a cell in hardware, wherein the chipset configured to receive multiple streams of instructions over a carrier network and the plurality of instances of the cell perform parallel processing of the multiple streams of instructions that update software or firmware in the mobile handset, wherein the multiple streams of instructions include information on which op-codes can be executed in parallel by the plurality of instances of the cell and which op-codes depend on completion of previous op-codes.

2. The mobile handset of claim 1, wherein each cell comprises an update agent instructions functional block that implements instructions for SET and COPY, a cyclic redundancy check (CRC) instructions functional block that implements CRC computations, and a fault tolerant instructions functional block that implements fault tolerant for interruptions to updates to the software or firmware.

3. The mobile handset of claim 1, wherein each cell is included in an update agent hardware engine that performs cyclic redundancy check (CRC) computations.

4. The mobile handset of claim 1, further comprising an update agent in the hardware, wherein the multiple streams of instructions include an op-code stream and a data stream, and the update agent executes in parallel the op-code stream and the data stream.

5. A method, comprising:

generating updates for software or firmware of mobile electronic devices;

transmitting the updates as multiple instruction streams through a carrier network to the mobile electronic devices; and processing the multiple instruction streams in parallel by a chipset that includes a plurality of instances of a cell in hardware at the mobile electronic devices to speed up processing of the updates by an agent in the mobile electronic devices, wherein the multiple instruction streams include information on which op-codes can be executed in parallel by the plurality of instances of the cell and which op-codes depend on completion of previous op-codes.

6. The method of claim 5, further comprising:

determining information on which instructions in the updates can be executed in parallel and which instructions in the updates are dependent on completion of previous instructions;

sending the information to the mobile electronic devices.

7. The method of claim 5 further comprising, updating the firmware or the software by the agent located in hardware.

8. The method of claim 5 further comprising, delivering the updates to the mobile electronic devices based on a firmware version in the mobile electronic devices.

9. A system, comprising:

a generator that generates an update package; and a mobile electronic device that includes a hardware implementation of multiple update agents that process multiple instruction streams in parallel of the update package to update software or firmware in the mobile electronic device, wherein the multiple update agents are implemented as plural instances of cells on a chipset, and the multiple instruction streams include information on which op-codes can be executed in parallel by the plural instances of cells and which the op-codes depend on completion of previous op-codes.

10. The system of claim 9, wherein the generator determines information regarding which instructions can be executed in parallel and communicates the information in the update package to the mobile electronic device.

11. The system of claim 9 further including an update driver in the mobile electronic device, wherein the multiple update agents are implemented entirely in hardware and the update driver provides the multiple update agents with information regarding blocks of memory to be updated in the mobile electronic device.

12. The system of claim 9, wherein the multiple agents process the multiple instruction streams in parallel to speed up execution of the update package to the software or firmware in the mobile electronic device.

* * * * *